United States Patent [19]
Kruckemeyer et al.

[11] Patent Number: 5,690,195
[45] Date of Patent: Nov. 25, 1997

[54] ALTERNATING STATE PRESSURE REGULATION VALVED DAMPER

[75] Inventors: William Charles Kruckemeyer, Beavercreek; Patrick Neil Hopkins, Miamisburg; Richard Edward Longhouse, Dayton; Michael Anthony Dimatteo, Kettering; Michael Leslie Oliver, Xenia, all of Ohio

[73] Assignee: General Motors Corporation, Detroit, Mich.

[21] Appl. No.: 687,862

[22] Filed: Jul. 29, 1996

[51] Int. Cl.$^6$ .................................. F16F 9/46; F16F 9/34
[52] U.S. Cl. ............... 188/299; 188/322.15; 188/317; 188/280
[58] Field of Search ....................... 188/299, 322.15, 188/322.22, 281, 282, 322.13, 280, 317, 318, 320; 280/707; 364/424.046

[56] References Cited

U.S. PATENT DOCUMENTS

| | | | |
|---|---|---|---|
| 4,923,038 | 5/1990 | Lizell | 188/299 |
| 5,139,119 | 8/1992 | Karnopp | 188/299 |
| 5,409,088 | 4/1995 | Sonsterod | 188/299 |
| 5,560,454 | 10/1996 | Jensen et al. | 188/299 |

FOREIGN PATENT DOCUMENTS 2164723  9/1985  United Kingdom.

Primary Examiner—Douglas C. Butler
Attorney, Agent, or Firm—Jeffrey A. Sedlar

[57] ABSTRACT

A damper includes a piston that carries a relatively compact control valve for controlling fluid flow through the piston. The control valve provides a variable amount of damping by regulating damper fluid flow between the extension chamber and the compression chamber of the damper during extension and compression strokes. Pressure regulation across the piston is controlled through two alternate flow paths as determined by the control valve. Damping through the first flow path is relatively soft and is determined according to the deflective characteristics of first and second single bi-directional annular disc valves in parallel. Damping through the second flow path is relatively firm and is determined solely by the second bi-directional single annular disc.

14 Claims, 3 Drawing Sheets

ALTERNATING STATE PRESSURE REGULATION VALVED DAMPER

BACKGROUND OF THE INVENTION

The present invention relates to an alternating state pressure regulation valved damper and more particularly, to a damper with electrically controlled alternating pressure regulation which provides variable damping rates for a vibration damper through individual or multiple passive valving.

Conventional vehicle suspension dampers typically consist of direct double-acting telescopic hydraulic passive dampers. They are generally described as either shock absorbers or struts. A primary purpose of shock absorbers is to dampen oscillations of the vehicle suspension spring. This is accomplished by converting kinetic energy in the form of motion between sprung and unsprung masses of a vehicle into heat and then dissipating the heat. Struts also serve this capacity and in addition, support reaction and side-load forces on the suspension.

Typical dampers are hydraulic devices using oil as the medium for converting motion into heat. As the damper is cycled a piston is forced to move in extension and compression directions through the oil that is contained within a cylinder tube. This creates pressure within a portion of the cylinder tube and a consequent pressure drop across the piston. During an extension stroke, high pressure is created in the extension chamber of the cylinder tube above the piston, forcing oil to flow through the valving of the piston. During a compression stroke, high pressure is created in the compression chamber of the cylinder tube below the piston, forcing oil to flow back through the piston's valving. As the piston moves an additional amount of oil substantially equal to the volume of the piston rod entering or exiting the cylinder tube is forced through the piston valving or through a valve on the base of the cylinder tube in combination with the piston valving in compensation.

As oil is forced to flow through the orifices in the piston valve and/or the base valve a pressure drop is effected and the oil is heated. Through this mechanism dampers dissipate energy stored by the vehicle's suspension springs. The extent to which the oil is heated and consequently, the amount of energy dissipated is controlled by the size of the orifices in the valving and the amount of flow forced through the valving.

Damping force is a common measurement of the performance of a damper. It is used to quantify the amount of spring control provided by a damper. Passive dampers are tuned to provide selected vehicle performance characteristics. Because passive dampers provide a set damping force they are generally somewhat of a compromise in providing optimum damping performance over a wide range of operating conditions.

The concept of dampers with an electrically controlled damping rate has been developed in the art wherein an algorithm is used to provide a control mechanism as a means of varying the damping force provided by a damper. This is typically achieved by varying the valving orifices in response to various sensors which are used to detect current real world operating conditions. Such dampers adjust the damping force in response to the control mechanism so that various performance characteristics can be provided by an individual damper. A controllable orifice however, provides less than ideal levels of control at low flow rates.

Electrically controlled hydraulic dampers for vehicle suspensions have, in principle, been known in the art for some time. However, their actual widespread application and use have been somewhat of a recent phenomenon. A known type of adjustable damper which includes a control valve positioned near the piston carries components of the control valve within the piston rod. This necessitates a piston rod of a relatively large diameter. Additional volume required to accommodate the displacement resulting from a large diameter rod unpreferably increases the overall size of the damper and detracts from the active length of the assembly. Another type of known adjustable damper carries the control valve outside the cylinder tube. This type of design necessitates consideration of the externally carried valve when packaging the damper within the suspension system.

SUMMARY OF THE INVENTION

It is an aspect of the present invention to provide a damper with an acceptable active length and effective variable damping fluid flow control in a preferred monotube design. This is accomplished through an alternating state pressure regulation valved damper piston. A damper in accordance with this aspect includes a cylinder slidably carrying a piston which separates the cylinder into extension and compression chambers. The piston carries a relatively compact control valve for controlling fluid flow through the piston. The control valve provides a variable amount of damping by regulating damper fluid flow between the extension chamber and the compression chamber of the damper during extension and compression strokes. Pressure regulation across the piston is controlled through two alternate flow paths as determined by the control valve.

A first bi-directional, deflectable, single annular disc passive damping valve mechanism is positioned on the piston between the extension and compression chambers. The first passive damping valve provides pressure regulation across the piston for both extension and compression strokes during all operation of the damper. A second bi-directional, deflectable, single annular disc passive damping valve mechanism is positioned on the piston between the extension and compression chambers. The second passive damping valve selectively provides alternate pressure regulation across the piston in parallel with the first passive damping valve during both extension and compression strokes.

The control valve includes a movable element responsive to a control mechanism. The flow passage through the piston includes a first branch that communicates through ports in the control valve, and flow therethrough is alternately interrupted or permitted as determined by the control mechanism. When flow through the first branch is permitted by the control valve, the flow passage through the piston extends through the first passive valve and the control valve and through a second branch that includes the second passive valve in a parallel arrangement with the first passive valve. When flow through the first branch is interrupted by the control valve, the flow passage through the piston extends only through the second branch which includes the second passive valve individually.

Advantages of the present invention include internal packaging of the control valve which utilizes less space than externally packaged designs that carry the control valve outside the cylinder tube or designs that carry components of the control valve within the piston rod. Additionally, the active length of the damper is maximized.

DETAILED DESCRIPTION OF THE PRESENTLY PREFERRED EMBODIMENT

Figure 1:
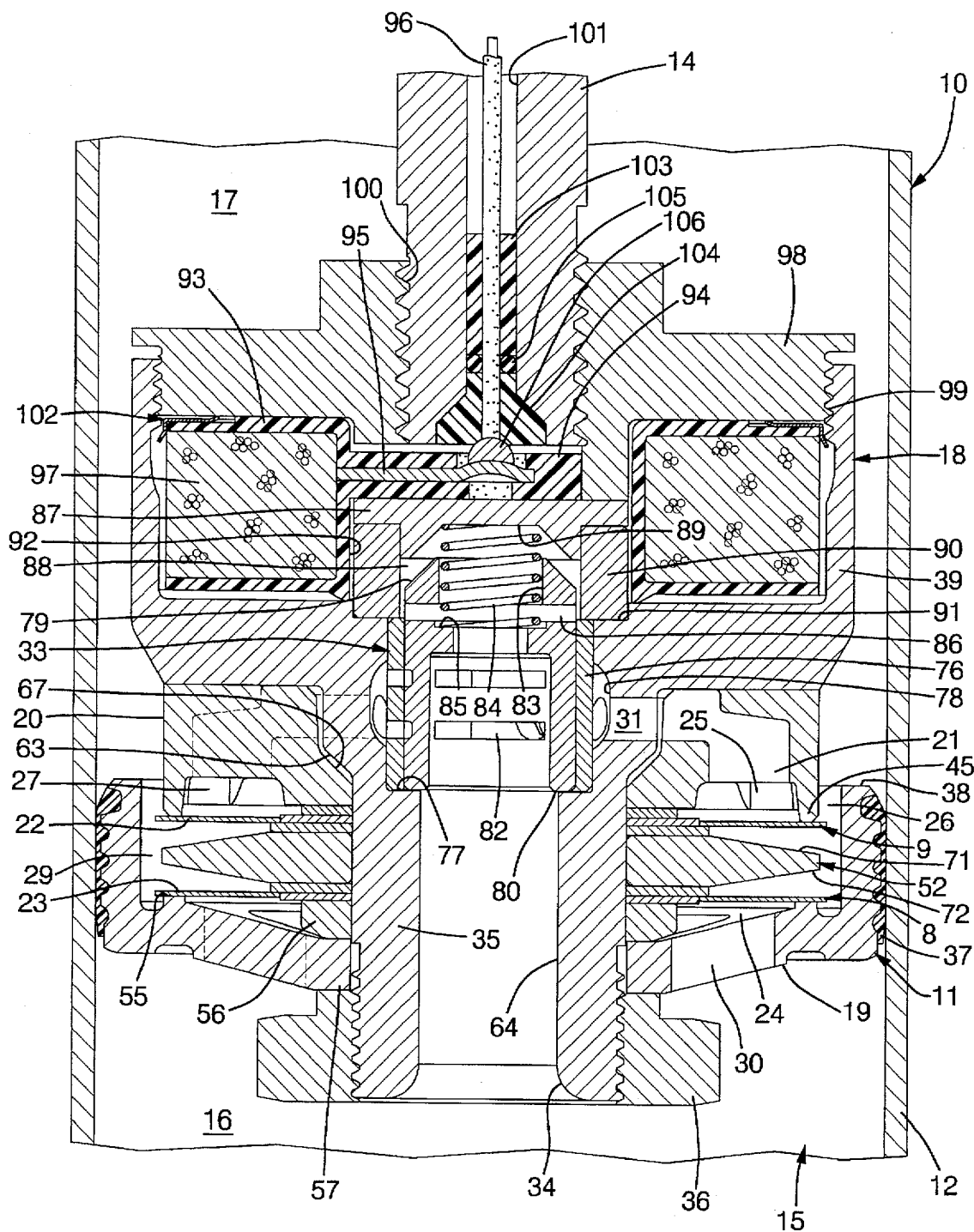
FIG. 1 is a fragmentary cross sectional view of an alternating state pressure regulation valved monotube damper.

Referring to the drawings, illustrated in FIG. 1 is an alternating state pressure regulation valved monotube suspension damper embodied as shock absorber 10. Shock absorber 10 includes a single tube designated as cylinder 12. Cylinder 12 has a closed lower end (not illustrated), and an upper end closed by a rod guide (not illustrated), in a conventional manner defining cylindrical cavity 15. Cavity 15 is divided into extension chamber 17 and compression chamber 16 by a piston assembly 11. Piston assembly 11 is sealingly disposed in cylinder 12 for slidable axial movement therein.

Securely connected to piston assembly 11 is piston rod 14 which extends through extension chamber 17 of cylinder tube 12 exiting the cavity 15 through the rod guide. The upper end of the piston rod 14 is adapted for connection to the sprung mass (body), of the motor vehicle (not illustrated), in a conventional manner. A similar means of attachment is provided at the lower end (not illustrated), of cylinder 12 for connection to the unsprung mass (wheel assembly), of the vehicle in a conventional manner. Relative movement between the sprung and unsprung masses of the vehicle, to which shock absorber 10 is connectable, produces relative axial sliding movement of the piston assembly 11 within the cylinder 12.

The piston assembly 11 includes a control valve assembly 18 that is carried on the bottom of the rod 14 and is connected therewith through means of mating threads. A piston cup 19 is received on the cylindrical body 35 of control valve assembly 18 and is fixed thereon by a threaded nut 36. The piston cup 19 includes a seal ring 37 made of low friction material. Seal ring 37 sealingly bears against the cylinder 12 providing fluid separation between the compression chamber 16 and the extension chamber 17.

The piston cup 19 spans between the cylindrical body 35 of control valve assembly 18 and the cylinder 12 opening at its top to the extension chamber 17 within the rim 38. Piston cup 19 is provided with a plurality of openings 30 which open the interior of the piston cup 19 to the compression chamber 16. Therefore, a flow passage 26 is provided through the piston assembly 11 between the compression chamber 16 and the extension chamber 17. The flow passage 26, and more specifically the branch 24 thereof, is normally closed by the passive valve assembly 8. A second branch 25 of the flow passage 26 extends through the control valve 33 and the passive valve assembly 9 in parallel to the branch 24.

More specifically, a valve plate 20 is positioned on the cylindrical body 35 partially within the piston cup 19 and supports a bi-directional, deflectable, single annular valve disc 22. A second bi-directional, deflectable, single annular valve disc 23 is supported by the piston cup 19. A control valve 33 is carried within the control valve assembly 18 in central bore 64 and operates to selectively provide a flow path between the openings 31 and 34 through the control valve assembly 18. Accordingly, during compression or extension travel of the piston assembly 11 within the cylinder 12 fluid flow between the extension chamber 17 and the compression chamber 16 can be through either of two branches 24 and 25 through a flow passage 26 across the piston assembly 11.

When the control valve 33 is in the open position as shown, fluid flow travels through the passive valve assembly 8, deflecting disc 23 if pressure differentials dictate, and through the control valve 33 and passive valve assembly 9 deflecting disc 22 providing one level of damping. This effects a first pressure drop for fluid travel across the piston assembly 11 providing a first degree of pressure regulation for a first state of operation of the shock absorber 10. When the control valve 33 is moved to its closed position, fluid flow between the extension chamber 17 and the compression chamber 16 travels solely through passive valve assembly 8 deflecting disc 23 providing another level of damping. This effects a second pressure drop for fluid travel across the piston assembly 11 providing a second degree of pressure regulation for a second state of operation of the shock absorber 10.

Figure 2:
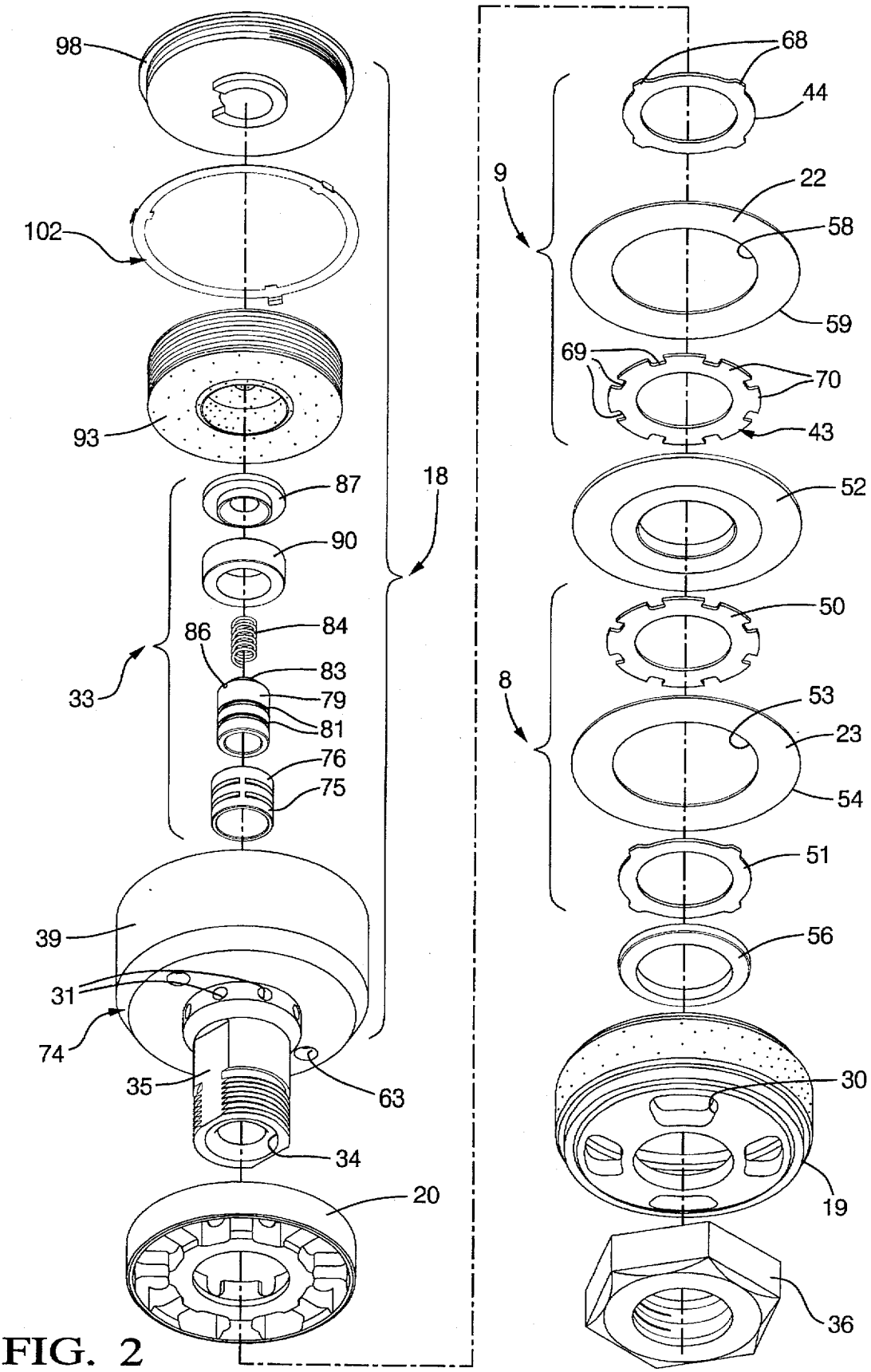
FIG. 2 is a perspective exploded view of the piston assembly of FIG. 1 including the control valve.

For more specificity, additional reference is directed to FIG. 2, along with FIG. 1. The control valve assembly 18 includes solenoid housing 39 and substantially cylindrical body 35. A flow path is effected through the control valve assembly 18 between the openings 31 provided in the side of cylindrical body 35 at annular shoulder 63 and the opening 34 provided in the end of cylindrical body 35 at the bottom of piston assembly 11o The control valve 33 is active during operation of the shock absorber 10, in-that, it is selectively positioned so that an open or closed flow path is provided between the openings 31 and 34. The opening and closing of control valve 33 is effected in a rapid and repeating manner in real time response to vehicle operating conditions via electronic control in a conventionally known manner or in response to manual selection when preferred.

The piston cup 19 is received on the cylindrical body 35 of the control valve assembly 18 and fixed thereon by the nut 36 thereby additionally carrying the various passive valving components of the piston assembly 11. Valve assemblies 8 and 9 of the piston assembly 11 are passive, in-that they respond only by deflection upon the presence of fluid pressure differentials at various stages across the piston assembly 11.

The juncture between the cylindrical body 35 and the solenoid housing 39 of the control valve assembly 18 includes an annular shoulder 63. A plurality of radially extending openings 31 are formed through the cylindrical body 35 at the annular shoulder 63 intersecting the central bore 64. The control valve assembly 33 opens and closes the openings 31 to the central bore 64.

A valve plate 20 is positioned over the cylindrical body 35 receiving the annular shoulder 63 within counterbore 67 and bearing against the solenoid housing 39. An annular groove 27 is formed in the valve plate 20. A number of openings 21 extend through the valve plate 20 providing a passage between the openings 31 and the annular groove 27. Therefore, when the control valve 33 is open, the branch 25 of passage 26 is open through the central bore 64, openings 31 and openings 21 to the annular groove 27. The branch 25 is normally closed by the valve assembly 9.

Valve assembly 9 includes a valve disc 22 that is received over the cylindrical body 35 of control valve assembly 18 against the valve plate 20. The valve disc 22 includes an inner periphery 58 that is spaced away from the cylindrical body 35. A center disc 44 is received over the cylindrical body 35 within the inner periphery 58. The center disc 44 includes a plurality of arms 68 that extend radially outward and operate to maintain the valve disc 22 in an operable position.

A support disc 43 is positioned over the cylindrical body 35 adjacent the valve disc 22 and center disc 44. The support disc 43 includes a number of notches 69 formed around its outer perimeter. The arms 70 remaining between each pair of adjacent notches 69 provide a bearing surface for the inner periphery 58 of the valve disc 22. The outer periphery 59 of the valve disc 22 bears against the annular rib 45 of the valve plate 20. The annular groove 27 spans radially across a portion of the center disc 44 and the valve disc 22. The valve disc 22 as positioned by the center disc 44 on the cylindrical body 35, is biased between the arms 70 at the outer periphery of the support disc 43 and the annular rib 45 of the valve plate 20.

An annular stop plate 52 is positioned over the cylindrical body 35 of control valve assembly 18 engaging the valve assembly 9 and maintaining the components thereof in axial position. The stop plate 52 includes an angled annular wall 71. The annular wall 71 provides a stop for valve disc 22 when it is deflected downward as viewed in FIG. 1. The annular wall 71 is oriented such that when the valve disc 22 is fully deflected during extension travel of the shock absorber 10, with its inner periphery 58 supported on the support disc 43, the valve disc 22 is positioned flat against the annular wall 71.

A second passive valve assembly 8 including support disc 50, center disc 51 and valve disc 23 is received over the cylindrical body 35 of control valve 18 adjacent the stop plate 52. The support disc 50 includes a plurality of arms like the arms 70 of support disc 43. The center disc 51 includes a plurality of arms like the arms 68 of center disc 44. The valve disc 23 is supported at its inner periphery 53 by the support disc 50 and at its outer periphery 54 by annular ledge 55 of piston cup 19. The valve disc 23 normally closes off the openings 30 through the piston cup 19. When the valve disc 23 is fully deflected during compression travel of the shock absorber 10, with its inner periphery 53 supported on support disc 51, the valve disc 23 is positioned flat against the angled annular wall 72 of stop plate 52.

A main spacer 56 is positioned against center disc 51 bearing against the annular leg 57 of piston cup 19 with the nut 36 applying a fixed bias to the annular leg 57 maintaining the piston cup 19, the first and second valve assemblies 9, 8 and the valve plate 20 in position on the cylindrical extension 35 of control valve assembly 18. This applies a preload to the valve discs 22 and 23 in a predetermined manner to selectively effect the damping performance produced by their deflecting characteristics.

FIG. 2 includes an exploded view of the control valve assembly 18. Additional reference is directed to FIG. 1. The valve support 74 houses the control valve assembly 18 and includes cylindrical body 35 and solenoid housing 39. The valve cylinder 76 is positioned within central bore 64 against step 77 as shown in FIG. 1. The valve cylinder 76 includes a number of slot openings 75 arranged in two tiers. An annular groove 78 is provided in valve support 74 in registry with the openings 31. The slot openings 75 register with the annular groove 78 so that open communication is ensured through the annular groove 78 between the slot openings 75 and the openings 31.

A valve spool 79 is received within the valve cylinder 76 and coacts therewith to provide a means of opening and closing the control valve 33. The valve spool 79 includes an open end 80 that makes contact with the step 77 when the control valve 33 is in the open position as shown in FIG. 1. A pair of grooves 81 extend completely around the valve spool 79 with a series of openings 82 provided in two tiers and registering with the grooves 81 providing a passageway through the valve spool 79. When the valve spool 79 is in an open position, the openings 82 and grooves 81 register with the slot opening 75 in the valve cylinder 76.

To close the control valve 33, the slot openings 75 are placed out of registry with the openings 82, blocking off fluid flow through the control valve 33 by movement of the valve spool 79 off the step 77. The relationship of the grooves 81, openings 82 and slot opening 75 render the angular positioning of the valve cylinder 76 and valve spool 79 relative to one another unimportant for operation of the control valve 33.

The present embodiment describes a normally open control valve 33. When preferable, a normally closed valve is provided by simply moving the axial location of the openings 82 out of registry with the slot openings 75 when the valve spool 79 is at-rest. With such a construction, registry is provided when the control valve 33 is energized.

The end 83 of the valve spool 79 is also open and receives a spring 84 that is engaged with step 85 and biases the valve spool 79 into the open position. The opening through the end 83 provides fluid balancing on opposed sides of the valve spool 79 to preempt the formation of opposing fluid forces across the valve spool 79. A cross bore 86 is also provided through the valve spool 79 so that when the end 83 is engaged with the pole piece 87 an opening is provided to the chamber 88 for fluid pressure balancing purposes.

The spring 84 is also engaged within the seat 89 of pole piece 87 and operates to bias the valve spool 79 away from the pole piece 87. A nonmagnetic spacer 90 is annular in shape, is positioned on step 91 and operates to maintain the pole piece 87 in a position that is spaced away from the valve cylinder 76. The spacer 90 also maintains the valve cylinder 76 in position within the central bore 64 against the step 77.

The pole piece 87 is securely seated within the bore 92 of bobbin 93 against the wall 94. The wall 94 carries an integral contact 95 which communicates between electrical lead 96 and the coil 97 which is wound on the bobbin 93 and comprises a plurality of turns of wire.

The control valve 33 including the solenoid assembly, is held in position by flux plate 98. Flux plate 98 includes exterior threads 99 for engagement with the valve support 74 and interior threads 100 for engagement with the piston rod 14. Accordingly, the piston assembly 11 is secured to the piston rod 14 through the flux plate 98.

The magnetic circuit of the control valve 33 includes pole piece 87, the flux plate 98, the valve support 74 and the valve cylinder 76. The primary air gap is provided between the valve spool 79 and the pole piece 87. The magnetic interface between the pole piece 87 and the valve spool 79 is conical in shape. As a result, the magnetic flux between the valve spool 79, which acts as an armature, and the pole piece 87, provides an increased magnetic force within the range of attraction as compared to a flat interface. The gradient reduction in axial magnetic flux as the valve spool 79 is moved away from the pole piece 87 is lessened during armature travel due to the conical interface.

The electrical circuit for supplying the coil 97 includes the electrical lead 96 which extends through an opening 101 to the top of the piston rod 14 for connection to control circuitry (not illustrated). The head 106 of lead 96 engages the contact 95 which communicates with the coil 97. The opposite end of the coil 97 is in communication with the ground clip 102 that is clipped onto the bobbin 93 and which engages the flux plate 98. The flux plate 98, which is threadedly engaged with the piston rod 14, exchanges electrical current therewith. The piston rod 14 acts as an electrical conductor in the circuit for a ground connection for the control circuitry. A cylindrical spacer 103 and an insulating annular spacer 104 are separated by a seal 105 and hold the head 106 of electrical lead 96 in position within the piston rod 14. Through means of the contact 95 and the ground clip 102 a means of assembling the threaded flux plate 98 and the bobbin 93 into the control valve assembly 18 is provided without soldered or similarly fixed electrical contacts.

During a compression stroke of the piston assembly 11 when the control valve 33 is in an open position, fluid flow is permitted through opening 34 in the bottom of cylindrical extension 35 of control valve assembly 18. Fluid passes through the control valve 33 and the openings 31 and 21 to the annular groove 27. This defines part of the branch 25 of the flow passage 26 through the piston assembly 11. In the annular groove 27, the fluid applies pressure to the valve disc 22 which, in relation to the pressure applied thereto, deflects at its outer periphery 59 with the inner periphery 58 remaining supported on the support disc 43.

Deflection of the valve disc 22 opens a flow passage between the outer periphery 59 thereof, and annular leg 45 of valve plate 20, permitting fluid flow through the piston assembly 11 from the compression chamber 16 to the extension chamber 17. The valve disc 22 effects a pressure drop as the fluid flows through the piston assembly 11 which results in a damping effect for the travel of piston assembly 11 within cylinder 12.

During compression travel of the piston assembly 11 fluid pressure is also applied to the valve disc 23. The valve disc 22 is designed to deflect under lower loading and therefore, the valve disc 23 remains substantially undeflected under low load conditions. However, since the valve discs 22 and 23 are arranged in parallel in the flow passage 26 with the control valve 33 open, a sufficiently high pressure differential across the piston assembly 11 will cause both valve discs 22 and 23 to open.

Figure 3:
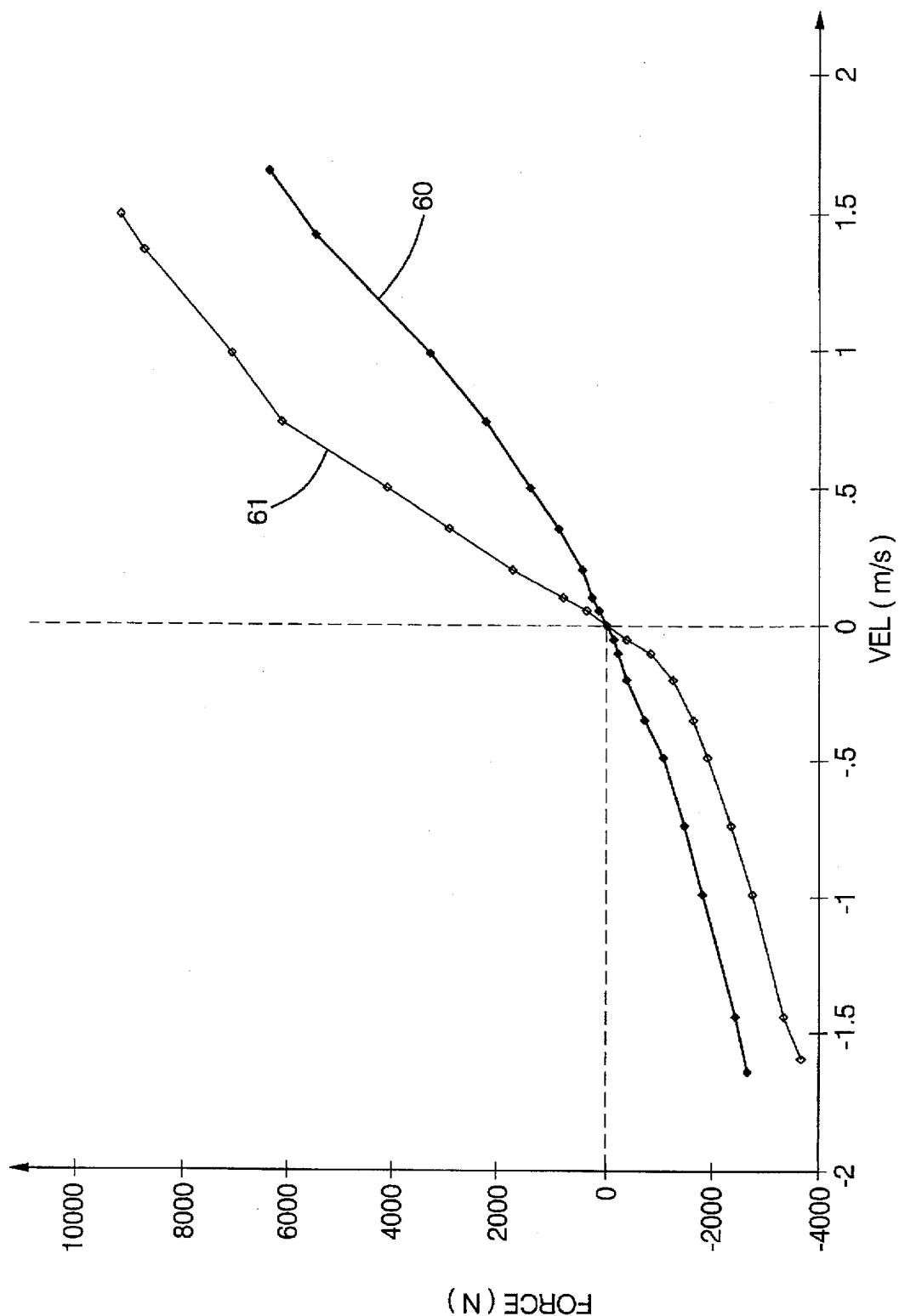
FIG. 3 is a performance curve showing force graphed on the abscissa and velocity graphed on the ordinate for the damper of FIG. 1 including both alternate pressure regulation functions.

The damping effect produced during compression by the passive valves, with control valve 33 opening branch 25 of fluid passage 26, is shown in FIG. 3 and is graphed in the quadrant defined by the negative abscissa and ordinate as curve 60. Curve 60 demonstrates the performance of the piston assembly 11 showing the damping force produced for a given velocity of travel through cylinder 12. The valve disc 22 is designed such that the damping effect it produces is significantly less than that produced by the valve disc 23 and therefore, when the control valve 33 is open, the valve disc 23 often remains seated against the annular ledge 55 and support disc 50 closing off branch 24 of the flow passage 26 through the piston assembly 11.

With the control valve 33 remaining open during movement of the piston assembly 11 in an extension stroke within the cylinder 12, the inner periphery 58 of the valve disc 22 is caused to deflect upward off the support disc 43. This opens a flow path from the extension chamber 17 into the annular groove 27, permitting fluid flow through the branch 25 of the flow passage 26 through the piston assembly 11 which extends through the open control valve 33 to the compression chamber 16. The valve disc 22 effects damping as a result of the pressure drop effected thereacross which is demonstrated by curve 60 of FIG. 3 as graphed in the quadrant defined by the positive abscissa and ordinate. This demonstrates the damping performance of the piston assembly 11 during an extension stroke showing the resultant force developed during travel of the piston assembly 11 within cylinder 12 for a given velocity. The valve assembly 8 again remains generally closed due to the relative properties of valve discs 22 and 23 and the preloads applied thereto.

When the control valve 33 is closed, the flow path through the branch 25 of the flow passage 26 through the piston assembly 11 is closed. Therefore, during compression and extension strokes of the piston assembly 11 within the cylinder 12, fluid must flow through the branch 24. During a compression stroke of the piston assembly 11, when the control valve 33 is closed, a fluid pressure effected in compression chamber 16 is communicated through the openings 30 of piston cup 19 and applied to the valve disc 23. When a sufficient fluid pressure is effected, the outer periphery 54 of valve disc 23 is deflected upward off the annular ledge 55 of piston cup 19 opening a flow passage to the annular space 29 of the branch 24 of flow passage 26. The valve disc 23 is supported at its inner periphery 53 on the support disc 50.

Within the piston assembly 11, the fluid is open to the extension chamber 17 past the rim 38 of piston cup 19. Therefore, fluid is permitted to flow from the compression chamber 16 to the extension chamber 17 through the branch 24 of flow passage 26 deflecting the valve disc 23. This results in a pressure drop for fluid flow through the passage 26 across the piston assembly 11 and is graphed in FIG. 3 for compression travel by curve 61 in the quadrant defined by the negative abscissa and ordinate. The performance curve 61 demonstrates that for a given velocity of the piston assembly 11 a significantly greater force is developed during the damping operation of the shock absorber 10 as compared to the performance demonstrated by curve 60 as effected through the control valve 33 and valve disc 22 of branch 25 in parallel with the branch 24.

During an extension stroke of the piston assembly 11 within the cylinder 12 with the control valve 33 closed, a pressure increase effected in extension chamber 17 is applied to the valve disc 23 causing the inner periphery 58 to deflect downward with the outer periphery 59 remaining supported on the annular ledge 55 and opening a flow path to the openings 30 and therethrough to the compression chamber 16. This flow travels through branch 24 of flow passage 26.

During extension of the shock absorber 10, as fluid flows through the branch 24 of passage 26 through the piston assembly 11 deflecting valve disc 23, a pressure drop occurs which effects the damping performance graphed by curve 61 in FIG. 3 in the quadrant defined by the positive abscissa and ordinate. As is demonstrated by FIG. 3, the developed damping force resulting from a given velocity for the travel of piston assembly 11 within the cylinder 12 is significantly greater for the curve 61 which graphs the single valve disc 23 then for the curve 60 which graphs the parallel combination of control valve 33 and valve disc 22 with valve disc 23.

Through means of the foregoing structure a compact manner of regulating pressure by controlling the pressure drop as fluid flows from one side of the piston assembly 11 to the other is provided. The pressure drop is modified by an electrical signal communicated to the control valve assembly 18, moving it between open and close positions. This selectively alternates the relative damping force effected by the piston assembly 11, between the body and wheel of a vehicle to which the shock absorber 10 is assembled. Since the control valve assembly 18 is carried with the piston assembly 11 instead of within the rod 14, the rod diameter can remain relatively small for a damper with an internal electrically variable valve. The relatively small rod size minimizes the amount of volumetric compensation required for fluid displacement resulting in reduced overall size requirements of the piston assembly 11 within the shock absorber 10. This tends to maximize the applications within which the shock absorber 10 can be utilized. The flow path through the deflectable disc valve assembly 8, or valve assemblies 8, 9, of the piston assembly 11, remains relatively direct for both alternate states of the pressure regulation valve scheme.

What is claimed is:

1. A suspension damper comprising:

a single cylinder defining a substantially liquid filled cavity;

a piston slidably positioned in the single cylinder separating the cavity into a compression chamber and an extension chamber;

a rod attached to the piston and extending through the extension chamber and exiting the cavity;

wherein the piston is slidable in a compression direction such that an increasing volume of the rod enters the cavity and in an extension direction such that an increasing volume of the rod exits the cavity wherein a passage is provided through the piston so that a liquid exchange is effected between the extension chamber and the compression chamber during sliding of the piston in the extension and compression directions;

wherein the passage has a first branch and second branch, the liquid exchange being selectively effected through the first branch that includes a bi-directional deflectable first single annular disc tuned to effect a relatively soft damping rate controlling damping forces at directions during both directions during extension direction and compression direction travel of the piston and the first branch also including a remotely operated control valve being selectively positioned in an open position substantially freely allowing liquid exchange through the first branch and a closed position substantially preventing liquid exchange through the first branch and the liquid exchange being selectively effected through the second branch that includes a bi-directional deflectable second single annular disc tuned to effect a relatively firm damping rate wherein when the remotely operated control valve is in the open position the monotube suspension damper develops a first damping rate wherein force is dependent upon velocity of the sliding piston and the first damping rate is substantially dependent upon the deflective characteristics of the first single annular disc and the second annular disc in parallel and when the remotely operated control valve is in the closed position the suspension damper develops a second damping rate wherein force and the second damping rate are dependent upon velocity of the sliding piston substantially as a result of the deflective characteristics solely of the second single annular disc.

2. A suspension damper according to claim 1 wherein the first damping rate and the second damping rate are both generally substantially greater when the piston slides in the extension direction then when the piston slides in the compression direction.

3. A suspension damper according to claim 1 wherein the remotely operated control valve includes an annular solenoid housing with a cylindrical extension formed as one piece with the solenoid housing, the cylindrical extension having a central bore opening to the compression chamber and wherein the piston includes a piston cup carried on the cylindrical extension.

4. A suspension damper according to claim 3 further comprising a valve plate carried on the cylindrical extension against the solenoid housing, the valve plate having a plurality of first openings that are normally closed by the second single annular disc and are openable to the extension chamber upon deflection of the second single annular disc and wherein an annular shoulder is formed between the solenoid housing and the cylindrical extension, the annular shoulder including a plurality of second openings that register with the central bore and with the plurality of first openings.

5. A suspension damper according to claim 4 wherein the valve plate includes an annular rib with the first single annular disc being normally biased against the annular rib to normally close the plurality of first openings off from the extension chamber.

6. A suspension damper according to claim 3 further comprising a stop plate carried on the cylindrical body between the solenoid housing and the piston cup wherein the stop plate includes a first angled annular wall engageable by the first single annular disc to limit travel of the first single annular disc and wherein the stop plate includes a second angled annular wall engageable by the second single annular disc to limit travel of the second single annular disc.

7. A suspension damper according to claim 6 wherein the first single annular disc includes an inner periphery and an outer periphery and further comprising a support disc carried on the cylindrical body the support disc having a plurality of arms supporting the inner periphery of the first single annular disc.

8. A suspension damper according to claim 7 further comprising a valve plate carried on the cylindrical body against the solenoid housing, the valve plate having an annular rib wherein the outer periphery of the first single annular disc is normally biased against the annular rib by a preload applied to the inner periphery by the arms of the support disc.

9. A suspension damper according to claim 3 further comprising a flux plate wherein the flux plate is connected onto the rod and wherein the solenoid housing is connected onto the flux plate to attach the piston to the rod.

10. A suspension damper according to claim 7 further comprising a coil having a bore and carried in the solenoid housing and further comprising a pole piece positioned in the bore.

11. A suspension damper according to claim 8 further comprising a valve spool slidably positioned in the central bore of the cylindrical body and further comprising a spring extending between the pole piece and the valve spool.

12. A suspension damper according to claim 1 further comprising;

a flux plate threaded onto the rod, the flux plate carried in the remotely operated control valve assembly;

a housing threaded onto the flux plate;

a coil wound on a bobbin and carried in the housing;

a ground clip engaging the bobbin and engaging the coil wherein the ground clip is positioned against the flux plate so that the coil is in electrical communication with the flux plate with the flux plate serving as a magnetic conductor in a magnetic circuit that operates the control valve assembly and the flux plate serving as an electrical conductor in an electrical circuit that operates the control valve assembly.

13. A suspension damper according to claim 12 wherein the bobbin includes an electrical contact formed in the bobbin and engaging the coil.

14. A suspension damper comprising:

a single cylinder defining a substantially liquid filled cavity;

a rod extending into the cavity;

a plate attached to the rod inside the cavity;

a piston slidably positioned in the single cylinder and attached to the plate, the piston separating the cavity into a compression chamber and an extension chamber;

wherein the piston is slidable in a compression direction such that an increasing volume of the rod enters the cavity and in an extension direction such that an increasing volume of the rod exits the cavity wherein a passage is provided through the piston so that a liquid exchange is effected between the extension chamber and the compression chamber during sliding of the piston in the extension and compression directions;

wherein the passage has a first branch and a second branch, the liquid exchange being selectively effected through the first branch that includes a bi-directional deflectable first single annular disc tuned to effect a relatively soft damping rate controlling damping forces at all flow rates in both directions during extension direction and compression direction travel of the piston and the first branch also including a remotely operated control valve being selectively positioned in an open position substantially freely allowing liquid exchange through the first branch and a closed position substantially preventing liquid exchange through the first branch and the liquid exchange being selectively effected through the second branch that includes a bi-directional deflectable second single annular disc tuned to effect a relatively firm damping rate wherein when the remotely operated control valve is in the open position the monotube suspension damper develops a first damping rate wherein force is dependent upon velocity of the sliding piston and the first damping rate is substantially dependent upon the deflective characteristics of the first single annular disc and the second annular disc in parallel and when the remotely operated control valve is in the closed position the suspension damper develops a second damping rate wherein force and the second damping rate are dependent upon velocity of the sliding piston substantially as a result of the deflective characteristics solely of the second single annular disc;

wherein the control valve responds to an electromagnetic force generated by in a magnetic circuit by a selectively energized electrical circuit wherein the plate is a conductor as a part of the electrical circuit and as part of the magnetic circuit.

* * * * *